(12) United States Patent
Ding et al.

(10) Patent No.: US 11,304,085 B2
(45) Date of Patent: Apr. 12, 2022

(54) METHOD FOR DETERMINING NETWORK QUALITY OF SERVICE FLOW, NETWORK ELEMENT, AND SYSTEM

(71) Applicant: Huawei Technologies Co., Ltd., Shenzhen (CN)

(72) Inventors: Hui Ding, Shenzhen (CN); Shufeng Shi, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/926,203

(22) Filed: Jul. 10, 2020

(65) Prior Publication Data

US 2020/0344638 A1 Oct. 29, 2020

Related U.S. Application Data

(63) Continuation of application No. PCT/CN2019/071581, filed on Jan. 14, 2019.

(30) Foreign Application Priority Data

Jan. 12, 2018 (CN) .......................... 201810031151.1

(51) Int. Cl.
*H04W 28/02* (2009.01)
*H04M 15/00* (2006.01)
(Continued)

(52) U.S. Cl.
CPC ......... *H04W 28/0268* (2013.01); *H04L 12/14* (2013.01); *H04L 29/08* (2013.01); *H04M 15/66* (2013.01); *H04W 28/12* (2013.01)

(58) Field of Classification Search
CPC . H04M 15/66; H04W 28/12; H04W 28/0268; H04L 12/14; H04L 29/08
See application file for complete search history.

(56) References Cited

U.S. PATENT DOCUMENTS 10,938,583 B2 * 3/2021 Qiao ................... H04L 63/0245
11,076,376 B2 * 7/2021 Youn ....................... H04W 8/20
(Continued)

FOREIGN PATENT DOCUMENTS

| CN | 101009631 A | 8/2007 |
|---|---|---|
| CN | 101222413 A | 7/2008 |

(Continued)

OTHER PUBLICATIONS

Huawei et al: "Clarification on QoS information", 1-14 3GPP Draft; C3-176346 WAS 6301 WAS 6191 WAS 6143 Clarification on QOS Information, 3rd Generation Partnership Project (3GPP), Mobile Competence Centre Nov. 27, 2017 XP051368133 (Year: 2017).*

(Continued)

*Primary Examiner* — Mehmood B. Khan
(74) *Attorney, Agent, or Firm* — Conley Rose, P.C.

(57) ABSTRACT

A method for determining a network quality of service (QoS) flow, a network element, and a system include receiving, by a session management function network element, a policy and charging control (PCC) rule from a policy control function network element, where the PCC rule includes QoS parameters, the QoS parameters include standardized QoS parameter indication information and a non-standardized QoS parameter, and the non-standardized QoS parameter includes at least one attribute comprised in a standardized QoS parameter corresponding to the standardized QoS parameter indication information and a corresponding value of the at least one attribute, and determining, by the session management function network element based on the standardized QoS parameter indication information and the non-standardized QoS parameter, a QoS flow corresponding to the PCC rule.

20 Claims, 3 Drawing Sheets

(51) Int. Cl.
*H04W 28/12* (2009.01)
*H04L 12/14* (2006.01)
*H04L 29/08* (2006.01)
*H04L 65/40* (2022.01)

(56) References Cited

U.S. PATENT DOCUMENTS

2017/0359749 A1 12/2017 Dao
2019/0116517 A1* 4/2019 Liu ................. H04W 28/24
2019/0116518 A1* 4/2019 Stojanovski ...... H04W 28/0257

FOREIGN PATENT DOCUMENTS

CN 104283693 A 1/2015
WO 2013064004 A1 5/2013

OTHER PUBLICATIONS

Nokia et al: 11 PCF provisioning of non-standardized 5QI 11, 3GPP Draft; S2-176711 E-Mail REV2 S2-176661 PCF Provision-of Non-Standardized 5QI, 3rd Generation Partnership Project (3GPP), Mobile Competence Centre; 650, Route Des Lucioles; F-06921 Sophia-Antipo—Sep. 1, 2017 XP051336016 (Year: 2017).*
Vodafone et al: 11 23.503 PCC in 5G 11, 3GPP Draft; S2-176954 PCC in 5G, 3rd Generation Partnership Project (3GPP), Mobile Competence Centre Oct. 22, 2017 (Oct. 22, 2017), XP051346910 (Year: 2017).*

S2-176412 Qualcomm Incorporated et al.,"TS 23.501: New QoS parameter for calculation window duration," SA WG2 Meeting #122bis, Aug. 21-25, 2017, Sophia Antipolis, France, 4 pages.
3GPP TS 23.501 V15.0.0, "3rd Generation Partnership Project; Technical Specification Group Services and System Aspects; System Architecture for the 5G System; Stage 2 (Release 15)," Dec. 2017, 181 pages.
3GPP TS 23.503 V15.0.0, "3rd Generation Partnership Project; Technical Specification Group Services and System Aspects; Policy and Charging Control Framework for the 5G System; Stage 2 (Release 15)," Dec. 2017, 56 pages.
C3-176346, Huawei, "Clarification on QoS information," 3GPP TSG-CT WG3 Meeting #93, Nov. 27-Dec. 1, 2017, Reno, USA, 5 pages.
S2-176711, Nokia, et al., "PCF provisioning of non-standardized 5QI," SA WG2 Meeting #122bis, Aug. 21-25, 2017, Sophia-Antipolis, France, 5 pages.
S2-176954, Vodafone, et al., "23.503 PCC in 5G," SA WG2 Meeting #123, Oct. 23-27, 2017, Ljubljana, Slovenia, 17 pages.
S2-177909, Ericsson, "[23.501] Clarification of QoS Flows with signalled characteristics," SA WG2 Meeting #123, Oct. 23-27, 2017, Ljubljana, 9 pages.
"Presentation of TS 23.503 "Policy and Charging Control Framework for the 5G System; Stage 2 (Release 15)" v1.0.0 for approval," 3GPP TSG SA Meeting #78 SP-170933, Dec. 20-22, 2017, Lisbon, Portugal, 60 pages.
Samsung, "Transport level packet marking provided by SMF," SA WG2 Meeting #121, S2-173185, May 15-19, 2017 Hangzhou, P.R. China, 8 pages.

* cited by examiner

METHOD FOR DETERMINING NETWORK QUALITY OF SERVICE FLOW, NETWORK ELEMENT, AND SYSTEM

CROSS-REFERENCE TO RELATED APPLICATIONS

This application is a continuation of International Patent Application No. PCT/CN2019/071581 filed on Jan. 14, 2019, which claims priority to Chinese Patent Application No. 201810031151.1 filed on Jan. 12, 2018. The disclosures of the aforementioned applications are hereby incorporated by reference in their entireties.

TECHNICAL FIELD

This application relates to the communications field, and in particular, to a method for determining a network quality of service (QoS) flow, a network element, and a system.

BACKGROUND

In a mobile communications technology, QoS can be guaranteed in a granularity of a QoS flow. Each QoS flow is bound to a corresponding policy and charging control (PCC) rule, QoS of a data service transmitted using the QoS flow is determined based on QoS parameters in the PCC rule to which the QoS flow is bound, and a session management function network element binds the PCC rule to the QoS flow. Therefore, how the session management function network element binds the QoS flow to the PCC rule exerts great impact on network QoS of the data service.

SUMMARY

This application provides a method for determining a network QoS flow, a network element, and a system such that an accuracy rate of determining a QoS flow corresponding to a PCC rule can be increased, thereby improving network QoS of a data service.

According to a first aspect, a method for determining a network QoS flow is provided, and the method includes receiving, by a session management function network element, a PCC rule from a policy control function network element, where the PCC rule includes QoS parameters, and the QoS parameters include standardized QoS parameter indication information and a non-standardized QoS parameter, and the non-standardized QoS parameter includes at least one attribute comprised in a standardized QoS parameter corresponding to the standardized QoS parameter indication information and a corresponding value of the at least one attribute, and determining, by the session management function network element based on the standardized QoS parameter indication information and the non-standardized QoS parameter, a QoS flow corresponding to the PCC rule.

Therefore, the session management function network element determines, using both the standardized QoS parameter indication information and the non-standardized QoS parameter, the QoS flow corresponding to the PCC rule, thereby increasing an accuracy rate of determining the QoS flow corresponding to the PCC rule, and accordingly guaranteeing network QoS of a data service transmitted using the QoS flow.

With reference to the first aspect, in some implementations of the first aspect, the standardized QoS parameter indication information is a $5^{th}$ generation (5G) QoS identifier (5QI) parameter value, and the non-standardized QoS parameter includes at least one of the following parameters and a corresponding value: a data packet delay budget (PDB), a data packet error rate (PER), an averaging window (AW), a priority level (PL), and a maximum data burst volume (MDBV).

In an existing method for determining a QoS flow corresponding to a PCC rule, the QoS flow corresponding to the PCC rule is usually determined based on the standardized QoS parameter indication information without considering the non-standardized QoS parameter. As a result, PCC rules having different non-standardized QoS parameter requirements are bound to a same QoS flow, and a same QoS guarantee may be used for services that require different QoS guarantees. Consequently, user experience may be degraded, and QoS cannot be guaranteed. For example, in the other approaches, a session management function network element binds, to a same QoS flow, a plurality of PCC rules including a same 5QI value but different non-standardized QoS parameters (for example, PLs). When the session management function network element receives a PCC rule {5QI: 1; PL: 10}, and determines that a QoS flow {5QI: 1; PL: 30} whose 5QI value is the same as that of the PCC rule exists in a current protocol data unit (PDU) session, the session management function network element binds the received PCC rule to the QoS flow. In this case, consequently, QoS of a service data flow corresponding to the received PCC rule cannot be guaranteed (a system provides a service guarantee for the service flow according to {5QI: 1; PL: 30}). In this application, when the QoS flow corresponding to the PCC rule is determined, the non-standardized QoS parameter is considered, for example, at least one of the following parameters: the PDB, the PER, the AW, the PL, and the MDBV, to ensure that PCC rules including same standardized QoS parameter indication information but different non-standardized QoS parameters are bound to different QoS flows, thereby increasing an accuracy rate of determining the QoS flow corresponding to the PCC rule, and improving user experience.

With reference to the first aspect, in some implementations of the first aspect, determining a QoS flow corresponding to the PCC rule includes, when there is a first QoS flow that matches both the standardized QoS parameter indication information and the non-standardized QoS parameter, determining, by the session management function network element, the first QoS flow as the QoS flow corresponding to the PCC rule, or when there is no QoS flow that matches both the standardized QoS parameter indication information and the non-standardized QoS parameter, determining, by the session management function network element, a second QoS flow as the QoS flow corresponding to the PCC rule, where QoS parameters corresponding to the second QoS flow are determined according to the PCC rule.

With reference to the first aspect, in some implementations of the first aspect, the PCC rule further includes a first parameter, and the first parameter is any parameter that can represent QoS and that is other than the standardized QoS parameter indication information and the non-standardized QoS parameter. The first parameter may be, for example, an allocation and retention priority (ARP) or a QoS notification control (QNC).

Determining a QoS flow corresponding to the PCC rule includes, when there is a first QoS flow that matches all of the standardized QoS parameter indication information, the non-standardized QoS parameter, and the first parameter, determining, by the session management function network element, the first QoS flow as the QoS flow corresponding to the PCC rule, or when there is no QoS flow that matches all of the standardized QoS parameter indication information, the non-standardized QoS parameter, and the first parameter, determining, by the session management function network element, a second QoS flow as the QoS flow corresponding to the PCC rule, where QoS parameters corresponding to the second QoS flow are determined according to the PCC rule.

In this case, when the PCC rule further includes the first parameter, the QoS flow corresponding to the PCC rule is determined using the standardized QoS parameter indication information, the non-standardized QoS parameter, and the first parameter such that an accuracy rate of determining the QoS flow corresponding to the PCC rule can be further increased.

With reference to the first aspect, in some implementations of the first aspect, the PCC rule further includes flow matching information, and when the session management function network element determines the second QoS flow as the QoS flow corresponding to the PCC rule, the method further includes sending, by the session management function network element, a flow identifier of the second QoS flow and the QoS parameters to an access network, sending, by the session management function network element, the flow identifier of the second QoS flow and the flow matching information to a user plane function (UPF) network element, and sending, by the session management function network element, the flow identifier of the second QoS flow and the flow matching information to user equipment.

With reference to the first aspect, in some implementations of the first aspect, the PCC rule further includes flow matching information, and when the session management function network element determines the first QoS flow as the QoS flow corresponding to the PCC rule, the method further includes sending, by the session management function network element, a flow identifier of the first QoS flow and a second parameter to an access network, where the second parameter is indication information for the access network updating a value of an attribute corresponding to a QoS parameter corresponding to the flow identifier of the first QoS flow, and sending, by the session management function network element, the flow identifier of the first QoS flow and the flow matching information to a UPF network element, and sending, by the session management function network element, the flow identifier of the first QoS flow and the flow matching information to user equipment.

According to a second aspect, a method for determining a network QoS flow is provided, and the method includes determining, by a policy control function network element, QoS parameters, where the QoS parameters include standardized QoS parameter indication information and a non-standardized QoS parameter, and the non-standardized QoS parameter includes at least one attribute comprised in a standardized QoS parameter corresponding to the standardized QoS parameter indication information and a corresponding value of the at least one attribute, and sending, by the policy control function network element, a PCC rule to a session management function network element, where the PCC rule includes the QoS parameters.

Therefore, the policy control function network element sends the PCC rule to the session management function network element. Because the PCC rule includes the standardized QoS parameter indication information and the non-standardized QoS parameter, the session management function network element determines, based on both the standardized QoS parameter indication information and the non-standardized QoS parameter, the QoS flow corresponding to the PCC rule, thereby increasing an accuracy rate of determining the QoS flow corresponding to the PCC rule, and accordingly improving network QoS of a data service.

With reference to the second aspect, in some implementations of the second aspect, the standardized QoS parameter indication information is a 5QI parameter value, and the non-standardized QoS parameter includes at least one of the following parameters and a corresponding value: a data PDB, a data PER, an AW, a PL, and an MDBV.

With reference to the second aspect, in some implementations of the second aspect, determining, by a policy control function network element, QoS parameters includes receiving, by the policy control function network element, the non-standardized QoS parameter from an application function network element, or receiving, by the policy control function network element, first indication information from an application function network element, and determining, by the policy control function network element, the non-standardized QoS parameter according to the first indication information and a first pre-configured policy, or receiving, by the policy control function network element, second indication information from the session management function network element, and determining, by the policy control function network element, the non-standardized QoS parameter according to the second indication information and a second pre-configured policy.

In this case, the policy control function network element determines the non-standardized QoS parameter such that the policy control function network element can dynamically determine the QoS parameters in real time to adjust the PCC rule in a timely manner, and then determine a QoS flow corresponding to an adjusted PCC rule, thereby increasing an accuracy rate of determining the QoS flow corresponding to the PCC rule, and accordingly improving network QoS of a data service.

According to a third aspect, a session management function network element is provided, including a receiving module configured to receive a PCC rule from a policy control function network element, where the PCC rule includes QoS parameters, the QoS parameters include standardized QoS parameter indication information and a non-standardized QoS parameter, and the non-standardized QoS parameter includes at least one attribute comprised in a standardized QoS parameter corresponding to the standardized QoS parameter indication information and a corresponding value of the at least one attribute, and a determining module configured to determine, based on the standardized QoS parameter indication information and the non-standardized QoS parameter, a QoS flow corresponding to the PCC rule.

With reference to the third aspect, in some implementations of the third aspect, the standardized QoS parameter indication information is a 5QI parameter value, and the non-standardized QoS parameter includes at least one of the following parameters and a corresponding value: a data PDB, a data PER, an AW, a PL, and an MDBV.

With reference to the third aspect, in some implementations of the third aspect, the determining module is further configured to, when there is a first QoS flow that matches both the standardized QoS parameter indication information and the non-standardized QoS parameter, determine, by the session management function network element, the first QoS flow as the QoS flow corresponding to the PCC rule, or when there is no QoS flow that matches both the standardized QoS parameter indication information and the non-standardized QoS parameter, determine, by the session management function network element, a second QoS flow as the QoS flow corresponding to the PCC rule, where QoS parameters corresponding to the second QoS flow are determined according to the PCC rule.

With reference to the third aspect, in some implementations of the third aspect, the PCC rule further includes a first parameter, and the first parameter is any parameter that can represent QoS and that is other than the standardized QoS parameter indication information and the non-standardized QoS parameter, and the determining module is further configured to, when there is a first QoS flow that matches all of the standardized QoS parameter indication information, the non-standardized QoS parameter, and the first parameter, determine, by the session management function network element, the first QoS flow as the QoS flow corresponding to the PCC rule, or when there is no QoS flow that matches all of the standardized QoS parameter indication information, the non-standardized QoS parameter, and the first parameter, determine, by the session management function network element, a second QoS flow as the QoS flow corresponding to the PCC rule, where QoS parameters corresponding to the second QoS flow are determined according to the PCC rule.

With reference to the third aspect, in some implementations of the third aspect, the PCC rule further includes flow matching information, and when the session management function network element determines the second QoS flow as the QoS flow corresponding to the PCC rule, the session management function network element further includes a sending module, and the sending module is configured to send a flow identifier of the second QoS flow and the QoS parameters to an access network, send the flow identifier of the second QoS flow and the flow matching information to a UPF network element, and send the flow identifier of the second QoS flow and the flow matching information to user equipment.

With reference to the third aspect, in some implementations of the third aspect, the PCC rule further includes flow matching information, and when the session management function network element determines the first QoS flow as the QoS flow corresponding to the PCC rule, the session management function network element further includes a sending module, and the sending module is configured to send a flow identifier of the first QoS flow and a second parameter to an access network, where the second parameter is indication information for the access network updating a value of an attribute corresponding to a QoS parameter corresponding to the flow identifier of the first QoS flow, send the flow identifier of the first QoS flow and the flow matching information to a UPF network element, and send the flow identifier of the first QoS flow and the flow matching information to user equipment.

According to a fourth aspect, a policy control function network element is provided, including a determining module configured to determine QoS parameters, where the QoS parameters include standardized QoS parameter indication information and a non-standardized QoS parameter, and the non-standardized QoS parameter includes at least one attribute comprised in a standardized QoS parameter corresponding to the standardized QoS parameter indication information and a corresponding value of the at least one attribute, and a sending module configured to send a PCC rule to a session management function network element, where the PCC rule includes the QoS parameters.

With reference to the fourth aspect, in some implementations of the fourth aspect, the standardized QoS parameter indication information is a 5QI parameter value, and the non-standardized QoS parameter includes at least one of the following parameters and a corresponding value: a data PDB, a data PER, an AW, a PL, and an MDBV.

With reference to the fourth aspect, in some implementations of the fourth aspect, the determining module is further configured to receive the non-standardized QoS parameter from an application function network element, or receive first indication information from an application function network element, and determine the non-standardized QoS parameter according to the first indication information and a first pre-configured policy, or receive second indication information from the session management function network element, and determine the non-standardized QoS parameter according to the second indication information and a second pre-configured policy.

According to a fifth aspect, a communications system is provided, and the communications system includes the session management function network element according to any one of the third aspect or the optional implementations of the third aspect and the policy control function network element according to any one of the fourth aspect or the optional implementations of the fourth aspect.

With reference to the fifth aspect, in some implementations of the fifth aspect, the system further includes an application function network element, and the application function network element sends a non-standardized QoS parameter or first indication information to the policy control function network element such that the policy control function network element determines the non-standardized QoS parameter, where the non-standardized QoS parameter includes at least one attribute comprised in a standardized QoS parameter corresponding to standardized QoS parameter indication information and a corresponding value of the at least one attribute.

According to a sixth aspect, a session management function network element is provided, including at least one processor, a memory, and a transceiver. The memory is configured to store an instruction, the transceiver is used by the session management function network element to communicate with another device, and the stored instruction is directly or indirectly executed by the at least one processor such that the session management function network element can perform the method in any one of the first aspect or the optional implementations of the first aspect.

According to a seventh aspect, a policy control function network element is provided, including at least one processor, a memory, and a transceiver. The memory is configured to store an instruction, the transceiver is used by the policy control function network element to communicate with another device, and the stored instruction is directly or indirectly executed by the at least one processor such that the policy control function network element can perform the method in any one of the second aspect or the optional implementations of the second aspect.

According to an eighth aspect, a chip system is provided, including at least one processor. The at least one processor is configured to execute a stored instruction such that a session management function network element can perform the method in any one of the first aspect or the optional implementations of the first aspect.

According to a ninth aspect, a chip system is provided, including at least one processor. The at least one processor is configured to execute a stored instruction such that a policy control function network element can perform the method in any one of the second aspect or the optional implementations of the second aspect.

According to a tenth aspect, a computer program product is provided. The computer program product includes an instruction, and when the instruction is executed, a session management function network element can perform the method in any one of the first aspect or the optional implementations of the first aspect.

According to an eleventh aspect, a computer program product is provided. The computer program product includes an instruction, and when the instruction is executed, a policy control function network element can perform the method in any one of the second aspect or the optional implementations of the second aspect.

According to a twelfth aspect, a computer storage medium is provided. The computer storage medium stores a program instruction, and when the instruction is executed, a session management function network element can perform the method in any one of the first aspect or the optional implementations of the first aspect.

According to a thirteenth aspect, a computer storage medium is provided. The computer storage medium stores a program instruction, and when the instruction is executed, a policy control function network element can perform the method in any one of the second aspect or the optional implementations of the second aspect.

DESCRIPTION OF EMBODIMENTS

The following describes technical solutions of this application with reference to the accompanying drawings.

The technical solutions of the embodiments of this application may be applied to various communications systems, such as a Global System for Mobile Communications (GSM), a code-division multiple access (CDMA) system, a wideband CDMA (WCDMA) system, a General Packet Radio Service (GPRS) system, a Long-Term Evolution (LTE) system, an LTE frequency-division duplex (FDD) system, an LTE time-division duplex (TDD) system, a Universal Mobile Telecommunications System (UMTS), a Worldwide Interoperability for Microwave Access (WIMAX) communications system, a future 5G system, or a New Radio (NR) system.

Figure 1:
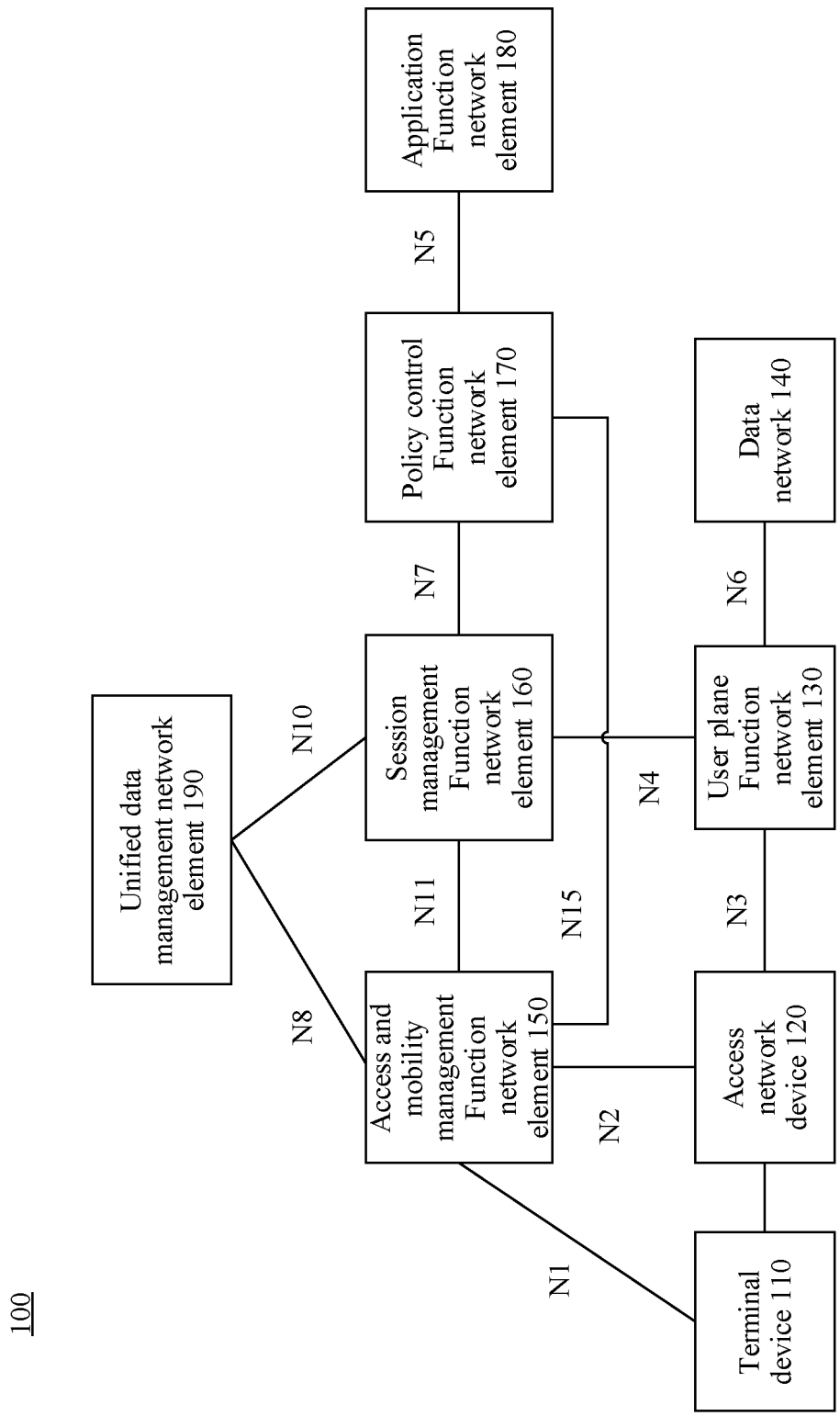
FIG. 1 is a schematic diagram of an architecture of a network element communications system according to this application.

FIG. 1 is a schematic diagram of a method for determining a network QoS flow and an architecture of a network element communications system 100 according to this application. As shown in FIG. 1, the system 100 includes a terminal device 110, an access network device 120, a UPF network element 130, a data network (DN) 140, an access and mobility management function (AMF) network element 150, a session management function (SMF) network element 160, a policy control function (PCF) network element 170, an application function (AF) network element 180, and a unified data management (UDM) network element 190. A connection may be established between network elements through a next generation (NG) network interface to implement communication. For example, the terminal device 110 establishes an air interface connection to the access network device 120 through a NR interface, to transmit user plane data and control plane signaling. The terminal device 110 may establish a control plane signaling connection to the AMF 150 through an NG interface 1 (N1). The access network device 120 may establish a user plane data connection to the UPF 130 through an NG interface 3 (N3). The access network device 120 may establish a control plane signaling connection to the AMF 150 through an NG interface 2 (N2). The UPF 130 may establish a control plane signaling connection to the SMF 160 through an NG interface 4 (N4). The UPF 130 may exchange user plane data with the DN through an NG interface 6 (N6). The AMF 150 may establish a control plane signaling connection to the SMF 160 through an NG interface 11 (N11). The SMF 160 may establish a control plane signaling connection to the PCF 170 through an NG interface 7 (N7). The PCF 170 may establish a control plane signaling connection to the AF 180 through an NG interface 5 (N5). The PCF 170 may establish a control plane signaling connection to the AMF 150 through an NG interface 15 (N15). The UDM 190 may establish a control plane signaling connection to the AMF 150 through an NG interface 8 (N8). The UDM 190 may establish a control plane signaling connection to the SMF 160 through an NG interface 10 (N10).

It should be understood that a name of an interface between network elements in this application is merely an example, and the interface between the network elements may have another name. The name of the interface is not limited in this application.

In FIG. 1, the terminal device 110 may be configured to connect, through a wireless air interface, to the access network device 120 deployed by an operator, and then be connected to the DN 140 using the UPF 130. The access network device 120 is mainly configured to implement functions such as a wireless physical layer function, resource scheduling, radio resource management, radio access control, and mobility management. The UPF 130 is configured to perform data flow forwarding, QoS control, charge statistics collection, and the like. The DN 140 may correspond to a plurality of different service domains, such as an Internet Protocol (IP) Multimedia Subsystem (IMS), the Internet, IP television (IPTV), and another operator service domain, and is mainly configured to provide the terminal device 110 with a plurality of types of data services. The DN 140 may include a network device such as a server, a router, or a gateway. The AMF 150 is configured to perform access and mobility management on the terminal device, receive UE mobility and network selection policies provided by the PCF 170, and execute the policies. The SMF 160 is configured to receive session and service flow control policies provided by the PCF 170, and execute the policies. The PCF 170 may generate a PCC rule based on request information of the AF 180, an operator policy, user subscription information, and the like to control network behavior, and deliver the PCC rules to a control plane network element. The AF 180 mainly provides requirements of an application side for a network side, where the requirements include a QoS requirement of a service flow, a mobility requirement of user equipment, and the like.

The foregoing terminal device 110 may be user equipment, an access terminal, a subscriber unit, a subscriber station, a mobile station, a mobile console, a remote station, a remote terminal, a mobile device, a user terminal, a terminal, a wireless communications device, a user agent, or a user apparatus. The terminal device 110 may alternatively be a cellular phone, a cordless telephone set, a Session Initiation Protocol (SIP) phone, a wireless local loop (WLL) station, a personal digital assistant (PDA), a handheld device having a wireless communication function, a computing device or another processing device connected to a wireless modem, an in-vehicle device, a wearable device, a terminal device in a future 5G network, a terminal device in a future evolved Public Land Mobile Network (PLMN), or the like. This is not limited in the embodiments of this application. The foregoing access network device may be a device configured to communicate with the terminal device. The access network device may be a base transceiver station (BTS) in a GSM or CDMA, or may be a NodeB (NB) in a WCDMA system, or may be an evolved NodeB (eNB or eNodeB) in an LTE system, or may be a radio controller in a cloud radio access network (CRAN) scenario. Alternatively, the access network device 120 may be a relay station, an access point, an in-vehicle device, a wearable device, or an access network (AN) device/a radio access network (RAN) device. A network includes a plurality of 5G-AN/5G-RAN nodes. The 5G-AN/5G-RAN node may be an access point (AP), a NG NB (gNB), a gNB whose central unit (CU) is separated from a distributed unit (DU), a transmission reception point (TRP), a transmission point (TP), or another access node. This is not limited in the embodiments of this application.

Some of the foregoing network elements may work independently, or may be combined to implement some control functions. For example, the AMF 150, the SMF 160, and the PCF 170 may be combined to serve as a management device, to implement access control and mobility management functions such as access authentication, security encryption, and location registration of the terminal device, session management functions such as user plane transmission path establishment, release, and change, and functions such as analysis of data (such as congestion) related to some slices and data related to the terminal device. As a gateway device, the UPF 130 mainly implements functions such as user plane data routing and forwarding, for example, is responsible for filtering a data packet of the terminal device, transmitting/forwarding data, controlling a rate, and generating charging information.

The method for determining a network QoS flow provided in this application may be applied to the session management function network element and the policy control function network element. The session management function network element and the policy control function network element each include a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system layer may be any one or more computer operating systems that process a service using a process, for example, a LINUX operating system, a UNIX operating system, an ANDROID operating system, an IOS operating system, or a WINDOWS operating system. The application layer includes applications such as a browser, a contact list, word processing software, and instant messaging software.

In addition, aspects or features of this application may be implemented as a method, an apparatus, or a product that uses standardized programming and/or engineering technologies. The term "product" used in this application covers a computer program that can be accessed from any computer readable component, carrier, or medium. For example, a computer readable medium may include but is not limited to a magnetic storage component (for example, a hard disk, a FLOPPY DISK, or a magnetic tape), an optical disc (for example, a compact disc (CD), a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to various media that can store, include, and/or carry an instruction and/or data.

FIG. 1 is merely a diagram of an example architecture. In addition to the functional units shown in FIG. 1, the network architecture may further include another functional unit or functional entity. This is not limited in the embodiments of the present disclosure.

To better understand this application, the following describes this application with reference to FIG. 2 to FIG. 5 using, as an example, a system that is the same as or similar to the system shown in FIG. 1.

Figure 2:
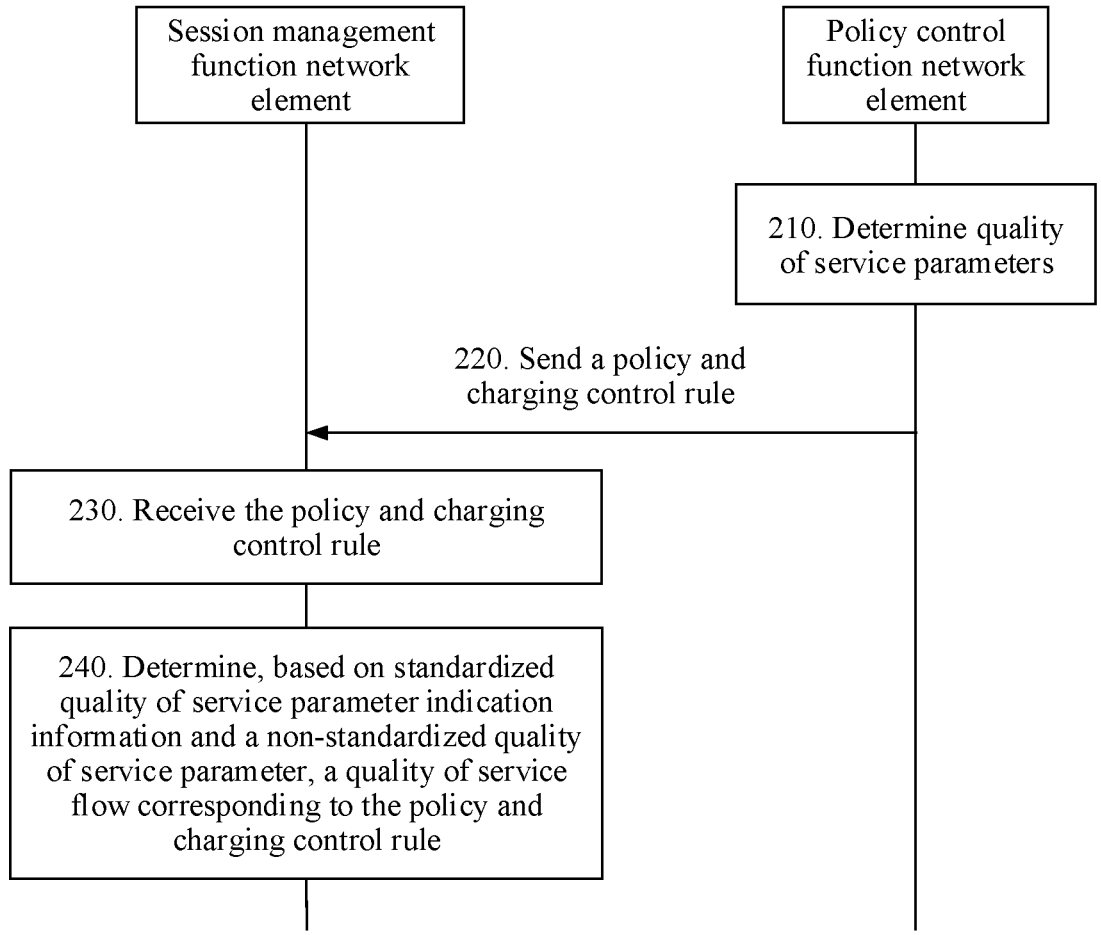
FIG. 2 is a schematic flowchart of a wireless communication method according to this application.

FIG. 2 is a schematic flowchart of a wireless communication method 200 according to this application. As shown in FIG. 2, the method 200 includes the following steps.

Step 210: A policy control function network element determines QoS parameters.

The QoS parameters include standardized QoS parameter indication information and a non-standardized QoS parameter, and the non-standardized QoS parameter includes at least one attribute comprised in a standardized QoS parameter corresponding to the standardized QoS parameter indication information and a corresponding value of the at least one attribute.

The QoS parameters indicate network QoS parameters of a QoS flow that matches a PCC rule. The QoS parameters may be divided into a standardized QoS parameter and a non-standardized QoS parameter. The standardized QoS parameters are a set of QoS parameters that can be determined using the standardized QoS parameter indication information. The non-standardized QoS parameter is a QoS parameter dynamically from the policy control function network element, and the non-standardized QoS parameter includes the at least one attribute comprised in the standardized QoS parameter corresponding to the standardized QoS parameter indication information and a corresponding value of the at least one attribute.

Step 220: The policy control function network element sends a PCC rule to a session management function network element, where the PCC rule includes the QoS parameters.

Step 230: The session management function network element receives the PCC rule from the policy control function network element.

Step 240: The session management function network element determines, based on the standardized QoS parameter indication information and the non-standardized QoS parameter, a QoS flow corresponding to the PCC rule.

Therefore, in this embodiment of this application, the policy control function network element determines the QoS parameters, and sends the PCC rule including the QoS parameters to the session management function network element, and the session management function network element determines, using both the standardized QoS parameter indication information and the non-standardized QoS parameter, the QoS flow corresponding to the PCC rule, thereby increasing an accuracy rate of determining the QoS flow corresponding to the PCC rule, and accordingly guaranteeing network QoS of a data service transmitted using the QoS flow.

It should be understood that, before step 210, the session management function network element obtains address information or domain name information of the policy control function network element, and may find, through addressing, the policy control function network element based on the address information or the domain name information, or the policy control function network element receives a request message from the session management function network element, where the request message includes address information or domain name information of the session management function network element, and may find, through addressing, the session management function network element based on the address information or the domain name information. The session management function network element may initiate a PCC rule request, and the policy control function network element may initiate a PCC rule update.

Optionally, the standardized QoS parameter indication information is a 5QI parameter value, and the non-standardized QoS parameter includes at least one of the following parameters: a data PDB, a data PER, an AW, a PL, and an MDBV.

Further, the 5QI parameter value is an index value, and one standardized QoS parameter can be determined based on the index value. The standardized QoS parameter includes a set of attributes and corresponding values, as shown in Table 1.

TABLE 1

| | Standardized 5QI parameter | | | | | | |
|---|---|---|---|---|---|---|---|
| 5QI parameter value | Resource type | PL | Data PDB | Data PER | MDBV | Averaging time window | Service example |
| 1 | GBR | 20 | 100 milliseconds (ms) | $10^{-2}$ | N/A | TBD | Voice service |

In Table 1, that the 5QI parameter value is 1 indicates a set of 5QI parameters in which the Resource Type is a guaranteed bit rate (GBR) type, the PL is 20, the PDB parameter is 100 ms, the PER is $10^{-2}$, and the MDBV and the AW are to be defined. That the 5QI parameter value is 1 indicates a set of parameters specified in a network protocol.

It should be understood that Table 1 merely shows a standardized QoS parameter corresponding to one 5QI parameter value. In practice, there may be different standardized QoS parameters corresponding to different 5QI parameter values.

Optionally, that a policy control function network element determines QoS parameters in step 210 includes the policy control function network element receives the non-standardized QoS parameter from an application function network element, or the policy control function network element receives first indication information from an application function network element, and the policy control function network element determines the non-standardized QoS parameter according to the first indication information and a first pre-configured policy, or the policy control function network element receives second indication information from the session management function network element, and the policy control function network element determines the non-standardized QoS parameter according to the second indication information and a second pre-configured policy.

Further, the policy control function network element receives the non-standardized QoS parameter from the application function network element. To be specific, the policy control function network element directly adds, to the PCC rule, the non-standardized QoS parameter from the application function network element, and sends the PCC rule to the session management function network element.

The first indication information may be application identifier information or 5-tuple information (including a source IP address, a source port, a destination IP address, a destination port, and a transport layer protocol) from the application function network element. The first indication information is indication information for the policy control function network element determining the non-standardized QoS parameter, and the policy control function network element determines the non-standardized QoS parameter according to the first indication information and the first pre-configured policy. The first pre-configured policy includes operator configuration information, user subscription information, and/or the like. The operator configuration information may be the following information a QoS parameter configuration for a specific application, or a pre-configuration operation, for example, parameter information, such as a bandwidth guarantee and a scheduling priority, pre-configured by an operator for a specific application, or gating information set for a specific application. The user subscription information may be the following information a user level, a specific-application value-added service to which a user subscribes, a user subscription package, and the like.

The second indication information may be request information from the session management function network element, and is used to request the PCF 170 to adjust the QoS parameters in the PCC rule. The second indication information may include an application event detection report, resource-constrained notification information, and/or the like. The application event detection report may carry an application identifier, and the resource-constrained notification information may carry a PCC rule ID.

In this case, the policy control function network element determines the non-standardized QoS parameter such that the policy control function network element can dynamically determine the QoS parameters in real time to adjust the PCC rule in a timely manner, and then determine a QoS flow corresponding to an adjusted PCC rule, thereby increasing an accuracy rate of determining the QoS flow corresponding to the PCC rule, and accordingly improving network QoS of a data service.

Optionally, determining a QoS flow corresponding to the PCC rule in step 240 includes when there is a first QoS flow that matches both the standardized QoS parameter indication information and the non-standardized QoS parameter, determining, by the session management function network element, the first QoS flow as the QoS flow corresponding to the PCC rule, or when there is no QoS flow that matches both the standardized QoS parameter indication information and the non-standardized QoS parameter, determining, by the session management function network element, a second QoS flow as the QoS flow corresponding to the PCC rule, where QoS parameters corresponding to the second QoS flow are determined according to the PCC rule.

A 5G network is used as an example. It is assumed that a first QoS flow exists on the session management function network element, QoS parameters corresponding to the first QoS flow are {5QI: 1, PL: 30}, and the QoS parameters included in the PCC rule from the policy control function network element are {5QI: 1, PL: 30}. Because the first QoS flow whose QoS parameters match {5QI: 1, PL: 30} exists on the session management function network element, the session management function network element binds the first QoS flow to the PCC rule.

It is assumed that a first QoS flow exists on the session management function network element, QoS parameters corresponding to the first QoS flow are {5QI: 1, PL: 10}, and the QoS parameters included in the PCC rule from the policy control function network element are {5QI: 1, PL: 30}. Because no QoS flow whose QoS parameters match {5QI: 1, PL: 30} exists on the session management function network element, the session management function network element creates a new second QoS flow for the PCC rule. QoS parameters corresponding to the second QoS flow are determined according to the PCC rule. To be specific, the QoS parameters corresponding to the second QoS flow are {5QI: 1, PL: 30}.

Optionally, in step 240, the PCC rule further includes a first parameter, and the first parameter is any parameter that can represent QoS and that is other than the standardized QoS parameter and the non-standardized QoS parameter.

Determining a QoS flow corresponding to the PCC rule includes when there is a first QoS flow that matches all of the standardized QoS parameter indication information, the non-standardized QoS parameter, and the first parameter, determining, by the session management function network element, the first QoS flow as the QoS flow corresponding to the PCC rule, or when there is no QoS flow that matches all of the standardized QoS parameter indication information, the non-standardized QoS parameter, and the first parameter, determining, by the session management function network element, a second QoS flow as the QoS flow corresponding to the PCC rule, where QoS parameters corresponding to the second QoS flow are determined according to the PCC rule.

Further, the first parameter may include an ARP and/or a QNC parameter.

A 5G network is used as an example. It is assumed that a first QoS flow exists on the session management function network element, QoS parameters corresponding to the first QoS flow are {5QI: 1, ARP: 2, PL: 30}, and the QoS parameters included in the PCC rule from the policy control function network element are {5QI: 1, ARP: 2, PL: 30}. Because the first QoS flow whose QoS parameters match {5QI: 1, ARP: 2, PL: 30} exists on the session management function network element, the session management function network element binds the first QoS flow to the PCC rule.

It is assumed that a first QoS flow exists on the session management function network element, QoS parameters corresponding to the first QoS flow are {5QI: 1, ARP: 3, PL: 10}, and the QoS parameters included in the PCC rule from the policy control function network element are {5QI: 1, ARP: 2, PL: 30}. Because no QoS flow whose QoS parameters match {5QI: 1, ARP: 2, PL: 30} exists on the session management function network element, the session management function network element creates a new second QoS flow for the PCC rule. QoS parameters corresponding to the second QoS flow are determined according to the PCC rule. To be specific, the QoS parameters corresponding to the second QoS flow are {5QI: 1, ARP: 2, PL: 30}.

In this case, when the PCC rule further includes the first parameter, the QoS flow corresponding to the PCC rule is determined using the standardized QoS parameter indication information, the non-standardized QoS parameter, and the first parameter such that an accuracy rate of determining the QoS flow corresponding to the PCC rule can be further increased.

Optionally, the PCC rule may further include the following parameters uplink (UL) and downlink (DL) maximum service flow bandwidths (UL and DL Maximum Flow BitRate), uplink and downlink guaranteed service flow bandwidths (UL and DL Guaranteed Flow BitRate), and a precedence. The precedence indicates a precedence of the PCC rule, to be specific, precedence processing performed when a data flow can match a plurality of PCC rules.

Optionally, the PCC rule further includes flow matching information. When the session management function network element determines the second QoS flow as the QoS flow corresponding to the PCC rule, the method 200 further includes sending, by the session management function network element, a flow identifier of the second QoS flow and the QoS parameters to an access network, sending, by the session management function network element, the flow identifier of the second QoS flow and the flow matching information to a UPF network element, and sending, by the session management function network element, the flow identifier of the second QoS flow and the flow matching information to user equipment.

Further, the session management function network element sends the QoS flow identifier (QFI) 2 of the second QoS flow and the QoS parameters to the access network such that the access network executes, when receiving a data packet whose header includes a QFI 2 marking, a QoS guarantee policy corresponding to the QFI 2 for the data packet.

It should be understood that the QoS parameter from the session management function network element to the access network may also be referred to as a QoS profile.

The session management function network element sends the QFI 2 and the flow matching information to the UPF network element. The flow matching information is included in the PCC rule from the policy control function network element, and the flow matching information is used to instruct to add the QFI 2 marking to a header of a data packet of a service data flow that matches the flow matching information. The flow matching information indicates a specific service data flow for which the PCC rule should be executed. The flow matching information is packet filter set information, and includes IP quintuplets (including a source IP address, a source port, a destination IP address, a destination port, and a transport layer protocol). When the UPF 130 receives a downlink data packet, the UPF 130 matches the downlink data packet with the corresponding second QoS flow based on a destination address of the downlink data packet and the flow matching information, and adds the QFI 2 marking to a header of the data packet. When receiving the data packet including the QFI 2 marking, the access network provides the data packet with a service guarantee of the QoS flow corresponding to the QFI 2.

The session management function network element sends the flow identifier of the second QoS flow and the flow matching information to the user equipment. When sending an uplink data packet, the user equipment matches the uplink data packet with the corresponding second QoS flow based on a destination address of the uplink data packet and the flow matching information, and adds the QFI 2 marking to a header of the data packet. When receiving the data packet including the QFI 2 marking, the access network provides the data packet with a service guarantee of the QoS flow corresponding to the QFI 2.

It should be understood that, the foregoing describes a case in which when the flow matching information included in the PCC rule is the packet filter set information, the session management function network element delivers the flow identifier and the flow matching information to both the user equipment and the UPF network element. However, when the flow matching information included in the PCC rule is an application identifier, the application identifier may not be sent to the user equipment, and therefore the UE may have no uplink flow matching information. The user equipment transmits an uplink data packet based on a default QoS flow. For example, the default QoS flow may be a QoS flow of a lowest matching priority. The session management function network element sends the application identifier and the flow identifier to the UPF network element. When receiving a downlink data packet, the UPF network element performs matching according to the application identifier and an application matching rule, and adds the flow identifier to a header of the downlink data packet if the matching succeeds. When the flow matching information included in the PCC rule is an application identifier, the session management function network element may alternatively send the application identifier and the flow identifier to the user equipment. The user equipment may determine an application type using information such as a peer uniform resource locator (URL) or a domain name address. If the determined application type is consistent with the application identifier, the user equipment adds the flow identifier to a header of the uplink data packet.

Optionally, the PCC rule further includes flow matching information. When the session management function network element determines the first QoS flow as the QoS flow corresponding to the PCC rule, the method 200 further includes sending, by the session management function network element, a flow identifier of the first QoS flow and a second parameter to an access network, where the second parameter is indication information for the access network updating a value of an attribute corresponding to a QoS parameter corresponding to the flow identifier of the first QoS flow, sending, by the session management function network element, the flow identifier of the first QoS flow and the flow matching information to a UPF network element, and sending, by the session management function network element, the flow identifier of the first QoS flow and the flow matching information to user equipment.

Further, the session management function network element sends the flow identifier QFI 1 of the first QoS flow and the second parameter to the access network. The second parameter is indication information for the access network updating the value of the attribute corresponding to the QoS parameter corresponding to the flow identifier of the first QoS flow. For example, the second parameter is {GBR: 5 megabytes (MB)}, and original QoS parameters corresponding to the first QoS flow are {5QI: 1, GBR: 3 MB, ARP: 2, PL: 20}. After receiving the flow identifier QFI 1 of the first QoS flow and the second parameter, the access network changes the QoS parameters corresponding to the first QoS flow to {5QI: 1, GBR: 5 MB, ARP: 2, PL: 20}. When receiving a data packet whose header includes a QFI 1 marking, the access network executes, for the data packet, a changed QoS guarantee policy corresponding to the QFI 1.

It should be understood that, for a specific process in which the session management function network element sends the flow identifier of the first QoS flow and the flow matching information to each of the UPF network element and the user equipment, correspondingly refer to a process in which the session management function network element sends the flow identifier of the second QoS flow and the flow matching information to each of the UPF network element and the user equipment. To avoid repetition, details are not described herein again.

Figure 3:
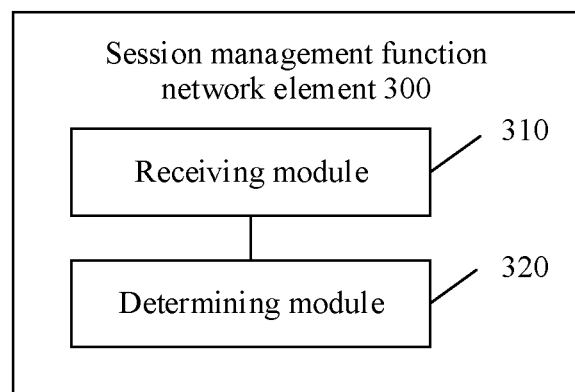
FIG. 3 is a schematic block diagram of a session management function network element according to this application.

FIG. 3 is a schematic block diagram of a session management function network element 300 according to this application. As shown in FIG. 3, the session management function network element 300 includes the following modules a receiving module 310 configured to receive a PCC rule from a policy control function network element, where the PCC rule includes QoS parameters, the QoS parameters include standardized QoS parameter indication information and a non-standardized QoS parameter, and the non-standardized QoS parameter includes at least one attribute comprised in a standardized QoS parameter corresponding to the standardized QoS parameter indication information and a corresponding value of the at least one attribute, and a determining module 320 configured to determine, based on the standardized QoS parameter indication information and the non-standardized QoS parameter, a QoS flow corresponding to the PCC rule.

Optionally, the receiving module 310 and the determining module 320 are configured to perform operations of the method 200 for determining a network QoS flow in this application. For brevity, details are not described herein again.

Figure 4:
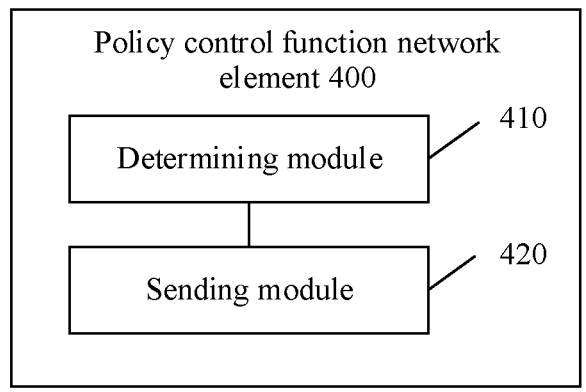
FIG. 4 is a schematic block diagram of a policy control function network element according to this application.

FIG. 4 is a schematic block diagram of a policy control function network element 400 according to this application. As shown in FIG. 4, the policy control function network element includes the following modules a determining module 410 configured to determine QoS parameters, where the QoS parameters include standardized QoS parameter indication information and a non-standardized QoS parameter, and the non-standardized QoS parameter includes at least one attribute comprised in a standardized QoS parameter corresponding to the standardized QoS parameter indication information and a corresponding value of the at least one attribute, and a sending module 420 configured to send a PCC rule to a session management function network element, where the PCC rule includes the QoS parameters.

Optionally, the determining module 410 and the sending module 420 are configured to perform operations of the method 200 for determining a network QoS flow in this application. For brevity, details are not described herein again.

The session management function network element and the policy control function network element completely correspond to the session management function network element and the policy control function network element in the method embodiment, and a corresponding module performs a corresponding step. For details, refer to the corresponding method embodiment.

Figure 5:
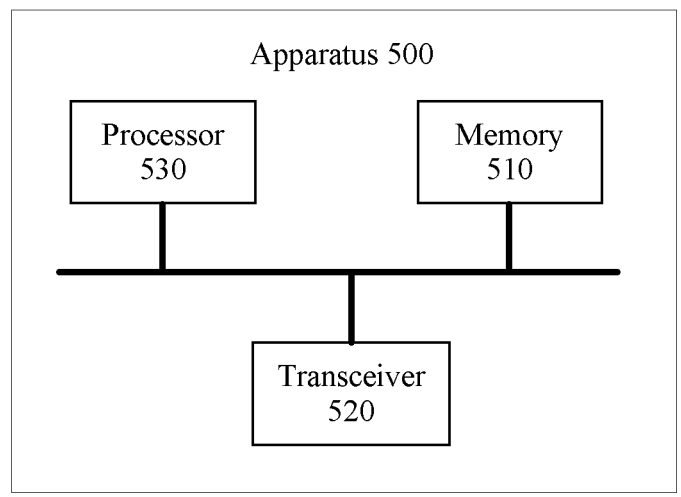
FIG. 5 is a schematic block diagram of a communications apparatus according to this application.

FIG. 5 is a schematic block diagram of a communications apparatus 500 according to this application. The communications apparatus 500 includes a memory 510 configured to store a program, where the program includes code, a transceiver 520 configured to communicate with another device, and a processor 530 configured to execute the program code in the memory 510.

Optionally, when the code is executed, the processor 530 may implement operations of the method 200. For brevity, details are not described herein again. The transceiver 520 is configured to perform specific signal receiving/sending under the driving of the processor 530.

The communications apparatus 500 may be the session management function network element or the policy control function network element. The processor performs an operation of the determining module. The transceiver may include a transmitter and/or a receiver, which respectively perform corresponding steps of the sending module and the receiving module.

Figure 6:
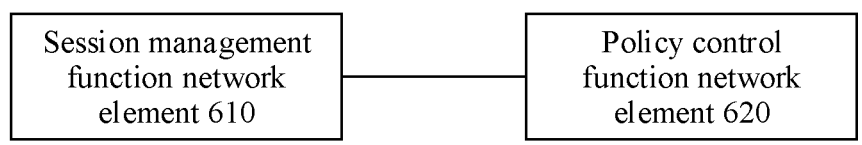
FIG. 6 is a schematic block diagram of a communications system according to this application.

FIG. 6 is a schematic block diagram of a communications system 600 according to this application. The communications system 600 includes a session management function network element 610 and a policy control function network element 620. For a connection between the session management function network element 610 and the policy control function network element 620, refer to corresponding descriptions in the system architecture in FIG. 1.

Optionally, the communications system 600 further includes an application function network element. The application function network element sends a non-standardized QoS parameter or first indication information to the policy control function network element to instruct the policy control function network element to determine the non-standardized QoS parameter. The non-standardized QoS parameter includes at least one attribute comprised in a standardized QoS parameter corresponding to standardized QoS parameter indication information and a corresponding value of the at least one attribute.

Further, the policy control function network element receives the non-standardized QoS parameter from the application function network element. To be specific, the policy control function network element directly adds, to a PCC rule, the non-standardized QoS parameter from the application function network element, and sends the PCC rule to the session management function network element.

The first indication information may be application identifier information or 5-tuple information (including a source IP address, a source port, a destination IP address, a destination port, and a transport layer protocol) from the application function network element. The first indication information is indication information for the policy control function network element determining the non-standardized QoS parameter.

It should be understood that the session management function network element 610 and the policy control function network element 620 are configured to perform operations of the method 200 for determining a network QoS flow in this application. For brevity, details are not described herein again.

The session management function network element and the policy control function network element completely correspond to the session management function network element and the policy control function network element in the method embodiment. For details, refer to the corresponding method embodiment.

It should be understood that the communications system 600 may further include another network element or functional entity. This is not limited in this embodiment of the present disclosure.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiment. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

It should be understood that the terms "and/or" and "at least one of A or B" in this specification describe only an association relationship for describing associated objects and represent that three relationships may exist. For example, A and/or B may represent the following three cases Only A exists, both A and B exist, and only B exists. In addition, the character "/" in this specification generally indicates an "or" relationship between the associated objects.

An embodiment of this application provides a computer readable medium configured to store a computer program. The computer program includes an instruction for performing the method for determining a network QoS flow in the foregoing embodiment of this application in FIG. 2. When the functions are implemented in a form of a software functional unit and sold or used as an independent product, the functions may be stored in a computer readable storage medium. Based on such an understanding, the technical solutions of this application essentially, or the part contributing to the other approaches, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a Universal Serial Bus (USB) flash drive, a removable hard disk, a read-only memory (ROM), a random-access memory (RAM), a magnetic disk, or an optical disc.

All or some of the foregoing embodiments may be implemented through software, hardware, firmware, or any combination thereof. When software is used to implement the embodiments, the embodiments may be implemented fully or partially in a form of a computer program product.

The computer program product includes one or more computer instructions. When the computer program instructions are loaded and executed on a computer, the procedures or functions according to this application are fully or partially generated. The computer may be a general-purpose computer, a special-purpose computer, a computer network, or other programmable apparatuses. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium, or a semiconductor medium (for example, a solid state disk (Solid State Disk (SSD))), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for determining a network quality of service (QoS) flow, wherein the method comprises:
   receiving, by a session management function network element, a policy and charging control (PCC) rule from a policy control function network element, wherein the PCC rule comprises a $5^{th}$ generation (5G) QoS identifier (5QI) parameter value and a non-standardized QoS parameter, and wherein the non-standardized QoS parameter comprises one or more of an averaging window (AW), a priority level (PL), or a maximum data burst volume (MDBV);
   determining, by the session management function network element based on the 5QI parameter value and the non-standardized QoS parameter, a first QoS flow corresponding to the PCC rule; and
   binding, by the session management function network element, the PCC rule to the first QoS flow.

2. The method of claim 1, further comprising:
   determining, by the policy control function network element, the PCC rule;
   sending, by the policy control function network element, the PCC rule to the session management function network element.

3. The method of claim 1, wherein determining the first QoS flow comprises:
   determining, by the session management function network element, whether a second QoS flow exists whose QoS parameters match both the 5QI parameter value and the non-standardized QoS parameter; and
   determining, by the session management function network element, the second QoS flow as the first QoS flow when the second QoS flow exists.

4. The method of claim 1, wherein determining the first QoS flow further comprises:
   determining, by the session management function network element, whether a second QoS flow exists whose QoS parameters match both the 5QI parameter value and the non-standardized QoS parameter; and
   determining, by the session management function network element, a new QoS flow as the first QoS flow when the second QoS flow does not exist, and wherein QoS parameters corresponding to the new QoS flow are based on the PCC rule.

5. The method of claim 1, wherein the PCC rule further comprises a first parameter, wherein the first parameter represents a QoS parameter and is other than the 5QI parameter value and the non-standardized QoS parameter, and wherein determining the QoS flow further comprises:
   determining, by the session management function network element, whether a second QoS flow exists whose QoS parameters match the 5QI parameter value, the non-standardized QoS parameter, and the first parameter; and
   determining, by the session management function network element, the second QoS flow as the first QoS flow when the second QoS flow exists.

6. The method of claim 1, wherein the PCC rule further comprises a first parameter, wherein the first parameter represents a QoS parameter and is other than the 5QI parameter value and the non-standardized QoS parameter, wherein determining the first QoS flow further comprises:
   determining, by the session management function network element, whether a second QoS flow exists whose QoS parameters match the 5QI parameter value, the non-standardized QoS parameter, and the first parameter; and
   determining, by the session management function network element, a new QoS flow as the first QoS flow when the second QoS flow does not exist, and wherein QoS parameters corresponding to the new QoS flow are based on the PCC rule.

7. The method of claim 4, wherein the PCC rule further comprises flow matching information, and wherein the method further comprises:
   sending, by the session management function network element, a flow identifier of the new QoS flow, the 5QI parameter value, and the non-standardized QoS parameter to an access network; and
   sending, by the session management function network element, the flow identifier of the new QoS flow and the flow matching information to a user plane function (UPF) network element.

8. The method of claim 6, wherein the PCC rule further comprises flow matching information, and wherein the method further comprises:
   sending, by the session management function network element, a flow identifier of the new QoS flow, the 5QI parameter value and the non-standardized QoS parameter to an access network; and
   sending, by the session management function network element, the flow identifier of the new QoS flow and the flow matching information to a user plane function (UPF) network element.

9. The method of claim 3, wherein the PCC rule further comprises flow matching information, and wherein the method further comprises:
   sending, by the session management function network element, a flow identifier of the second QoS flow and a second parameter to an access network, wherein the second parameter comprises indication information for the access network to update a value of an attribute corresponding to the QoS parameters of the second QoS flow; and sending, by the session management function network element, the flow identifier of the second QoS flow and the flow matching information to a user plane function (UPF) network element.

10. The method of claim 5, wherein the PCC rule further comprises flow matching information, and wherein the method further comprises:

sending, by the session management function network element, a flow identifier of the second QoS flow and a second parameter to an access network, wherein the second parameter comprises indication information for the access network to update a value of an attribute corresponding to the QoS parameters of the QoS flow; and sending, by the session management function network element, the flow identifier of the QoS flow and the flow matching information to a user plane function (UPF) network element.

11. A session management function network element comprising:

a memory configured to store program instructions; and a processor coupled to the memory, wherein the program instructions cause the processor to be configured to:

receive a policy and charging control (PCC) rule from a policy control function network element, wherein the PCC rule comprises a $5^{th}$ generation (5G) quality of service (QoS) identifier (5QI) parameter value and a non-standardized QoS parameter, and wherein the non-standardized QoS parameter comprises one or more of an averaging window (AW), a priority level (PL), or a maximum data burst volume (MDBV);

determine, based on the 5QI parameter value and the non-standardized QoS parameter, a first QoS flow corresponding to the PCC rule; and bind the PCC rule to the first QoS flow.

12. The session management function network element of claim 11, wherein the program instructions further cause the processor to be configured to:

determine whether a second QoS flow exists whose QoS parameters match both the 5QI parameter value and the non-standardized QoS parameter; and determine the second QoS flow as the first QoS flow when the second QoS flow exists.

13. The session management function network element of claim 11, wherein the program instructions further cause the processor to be configured to:

determine whether a second QoS flow exists whose QoS parameters match both the 5QI parameter value and the non-standardized QoS parameter; and determine a new QoS flow as the first QoS flow when the second QoS flow does not exist, and wherein QoS parameters corresponding to the new QoS flow are based on the PCC rule.

14. The session management function network element of claim 11, wherein the PCC rule further comprises a first parameter, wherein the first parameter represents a QoS parameter and is other than the 5QI parameter value and the non-standardized QoS parameter, and wherein the program instructions further cause the processor to be configured to:

determine whether a second QoS flow exists whose QoS parameters match the 5QI parameter value, the non-standardized QoS parameter, and the first parameter; and determine the second QoS as the first QoS flow when the second QoS flow exists.

15. The session management function network element of claim 11, wherein the PCC rule further comprises a first parameter, wherein the first parameter represents a QoS parameter and is other than the 5QI parameter value and the non-standardized QoS parameter, wherein the program instructions further cause the processor to be configured to:

determine whether a second QoS flow exists whose QoS parameters match the 5QI parameter value, the non-standardized QoS parameter, and the first parameter; and determine a new QoS flow as the first QoS flow when the second QoS flow does not exist, and wherein QoS parameters corresponding to the new QoS flow are based on the PCC rule.

16. The session management function network element of claim 12, wherein the PCC rule further comprises flow matching information, and wherein the program instructions further cause the processor to be configured to:

send a flow identifier of the second QoS flow and a second parameter to an access network, wherein the second parameter comprises indication information for the access network to update a value of an attribute corresponding to the QoS parameters of the second QoS flow; and send the flow identifier of the second QoS flow and the flow matching information to a user plane function (UPF) network element.

17. The session management function network element of claim 13, wherein the PCC rule further comprises flow matching information, and wherein the program instructions further cause the processor to be configured to:

send a flow identifier of the new QoS flow, the 5QI parameter value, and the non-standardized QoS parameter to an access network; and send the flow identifier of the new QoS flow and the flow matching information to a user plane function (UPF) network element.

18. The session management function network element of claim 14, wherein the first parameter comprises one or more of an allocation and retention priority (ARP) or a QoS notification control (QNC).

19. The method of claim 5, wherein the first parameter comprises at least one of QoS notification control (QNC) or allocation and retention priority (ARP) parameter.

20. The method of claim 6, wherein the first parameter comprises at least one of QoS notification control (QNC) or allocation and retention priority (ARP) parameter.

* * * * *